United States Patent
Yang (10) Patent No.: US 12,502,606 B2
(45) Date of Patent: Dec. 23, 2025

(54) INTERACTION METHOD AND APPARATUS FOR TACTICAL PLANS IN GAMES, AND ELECTRONIC DEVICE

(71) Applicant: NETEASE (HANGZHOU) NETWORK CO., LTD., Zhejiang (CN)

(72) Inventor: Zefeng Yang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 529 days.

(21) Appl. No.: 17/905,418

(22) PCT Filed: Feb. 8, 2021

(86) PCT No.: PCT/CN2021/076095
§ 371 (c)(1),
(2) Date: Sep. 1, 2022

(87) PCT Pub. No.: WO2021/179877
PCT Pub. Date: Sep. 16, 2021

(65) Prior Publication Data
US 2023/0111729 A1    Apr. 13, 2023

(30) Foreign Application Priority Data
Mar. 13, 2020   (CN) .................. 202010179778.9

(51) Int. Cl.
*A63F 13/537* (2014.01)
*A63F 13/2145* (2014.01)
*G06F 3/04883* (2022.01)

(52) U.S. Cl.
CPC ........ *A63F 13/537* (2014.09); *A63F 13/2145* (2014.09); *G06F 3/04883* (2013.01)

(58) Field of Classification Search
CPC ...... A63F 13/2145; A63F 13/22; A63F 13/23; A63F 13/42; A63F 13/426; A63F 13/533;
(Continued)

(56) References Cited

U.S. PATENT DOCUMENTS 10,792,562 B2 * 10/2020 Tang ................... G06F 3/04842
10,967,250 B2 * 4/2021 Miao ................... G06F 3/04815
(Continued)

FOREIGN PATENT DOCUMENTS

CN        101888886 A    11/2010
CN        106488789 A    3/2017
(Continued)

OTHER PUBLICATIONS

International Search Report dated May 11, 2021 of PCT International Application No. PCT/CN2021/076095.
(Continued)

*Primary Examiner* — Milap Shah
(74) *Attorney, Agent, or Firm* — Qinghong Xu (57) ABSTRACT

An interaction method and apparatus for tactical plans in games, and an electronic device. Said method comprises: in response to an assignment operation of a tactical strategy control, determining, on the basis of the assignment operation, a target virtual unit for implementing a tactical plan of the tactical strategy control; and triggering the target virtual unit to implement the tactical plan. In the process of a game, a user can directly trigger a target virtual unit to implement a tactical plan, so that the user's reaction speed and psychological expectations in a real-time combat are effectively improved, not only facilitating the user's macro operations, but also facilitating improvement of the experience of the game.

18 Claims, 4 Drawing Sheets

(58) Field of Classification Search
CPC ...... A63F 13/537; A63F 13/55; A63F 13/822; A63F 2300/1075; A63F 2300/308; A63F 2300/6045
See application file for complete search history.

(56) References Cited

U.S. PATENT DOCUMENTS

| | | | |
|---|---|---|---|
| 10,990,274 B2* | 4/2021 | Nakahara | G06F 3/04815 |
| 11,318,384 B2* | 5/2022 | Zhou | A63F 13/2145 |
| 2005/0070349 A1 | 3/2005 | Kimura | |
| 2014/0302901 A1 | 10/2014 | Namgoong | |
| 2017/0340959 A1* | 11/2017 | Tang | G06F 3/0488 |
| 2018/0043260 A1* | 2/2018 | Tang | A63F 13/822 |
| 2018/0339215 A1 | 11/2018 | Hu et al. | |
| 2019/0212916 A1* | 7/2019 | Wang | A63F 13/426 |
| 2020/0174618 A1* | 6/2020 | Wang | G06F 3/0488 |
| 2022/0305381 A1* | 9/2022 | Shao | A63F 13/5378 |

FOREIGN PATENT DOCUMENTS

| | | |
|---|---|---|
| CN | 109045698 A | 12/2018 |
| CN | 109568958 A | 4/2019 |
| CN | 111437598 A | 7/2020 |
| JP | H11300044 A | 11/1999 |
| JP | 2004174017 A | 6/2004 |
| JP | 2006087459 A | 4/2006 |
| JP | 2015070952 A | 4/2015 |
| JP | 2015229081 A | 12/2015 |
| JP | 2016019572 A | 2/2016 |
| JP | 2016147124 A | 8/2016 |
| JP | 2016209015 A | 12/2016 |
| JP | 2017012240 A | 1/2017 |

OTHER PUBLICATIONS

The 1st Office Action dated Dec. 2, 2020 of Chinese Patent No. 202010179778.9.

Nibili, Details of the top 5 formations in FIFA19 (Bilingual subtitle), BiliBili network, Dec. 30, 2018, https://www.bilibili.com/video/BV1Ut411z7bt?from=search&seid=13363299878962071345.

1st Office Action dated Jul. 17, 2023 of Japanese Application No. 2022-532858.

[Dragon Quest Walk] Monk's Sakusen is one choice "Other Strategy Introductions!", heacet.com[online], <URL: https://heacet.com/dqwalk-job-priest/>, Sep. 16, 2019.

1st Office Action dated Dec. 13, 2024 of Chinese Application No. 2022103288138.

* cited by examiner

INTERACTION METHOD AND APPARATUS FOR TACTICAL PLANS IN GAMES, AND ELECTRONIC DEVICE

CROSS REFERENCE

The present application is a National Stage of International Application No. PCT/CN2021/076095 filed on Feb. 8, 2021 which claims priority to Chinese Patent Application No. 202010179778.9 entitled "Interaction method and apparatus for tactical plans in games and electronic device", filed on Mar. 13, 2020, and both the entire contents of which are incorporated herein by reference.

TECHNICAL FIELD

The present disclosure relates to the technical field of information interaction, and in particular, to an interaction method and apparatus for tactical plans in games and electronic device.

BACKGROUND

For games of the RTS (Real-Time Strategy Game) type, players often play the role of generals in the game and perform macro operations such as dispatching troops. Due to a large number of battlefield units in RTS type games, as well as factors such as strategic immediacy, fine operation, and free strategic combination, in RTS type games, the real-time operation of virtual units needs to rely on manpower, and players are often unable to perform real-time operations due to the large number of virtual units and time factors, or it is difficult to perform effective macro operations, which reduces the experience of the game.

It should be noted that the information disclosed in the above background part is only used to strengthen the understanding of the background of the disclosure, so it can include information that does not constitute the prior art known to those skilled in the art.

SUMMARY

In some embodiments, the present disclosure provides an interaction method for tactical plans in games, where a graphical user interface is provided through a first terminal device, and a content displayed on the graphical user interface includes a virtual unit and at least one tactical strategy control, each the tactical strategy control is configured with a tactical plan, and the method includes: in response to an assignment operation of the tactical strategy control, determining a target virtual unit for implementing the tactical plan of the tactical strategy control based on the assignment operation; and triggering the target virtual unit to implement the tactical plan.

In some embodiments, the present disclosure provides an interaction apparatus for tactical plans in games, where a graphical user interface is provided through a first terminal device, and a content displayed on the graphical user interface includes a virtual unit and at least one tactical strategy control, each the tactical strategy control is configured with a tactical plan; and the apparatus includes: an assignment module, configured to perform determining, in response to an assignment operation of the tactical strategy control, a target virtual unit for implementing the tactical plan of the tactical strategy control based on the assignment operation; and an implementation module, configured to perform triggering the target virtual unit to implement the tactical plan.

In some embodiments, the present disclosure provides an electronic device, comprising a memory, a processor, and a computer program stored on the memory and executable on the processor. When the processor executes the computer program, the steps of the method according to some embodiments are implemented.

In some embodiments, the present disclosure provides a computer-readable storage medium. A computer program is stored on the computer-readable storage medium, and when the computer program is executed by a processor, the steps of the method according to some embodiments are executed.

BRIEF DESCRIPTION OF THE DRAWINGS

The drawings here are incorporated into and constitute a part of the description, showing embodiments in accordance with the present disclosure, and are used together with the description to explain the principles of the present disclosure. Obviously, the accompanying drawings in the following description are some embodiments of the present disclosure, and for those skilled in the art, other drawings can also be obtained from these drawings without creative efforts.

DETAILED DESCRIPTION

Example embodiments will now be described more fully with reference to the accompanying drawings. However, the example embodiments can be implemented in various forms, and should not be understood as limited to the examples set forth here; On the contrary, providing these embodiments will make the present disclosure more comprehensive and complete, and comprehensively convey the concept of the example embodiments to those skilled in the art. The described features, structures, or characteristics may be combined in any suitable manner in one or more embodiments. In the following description, many specific details are provided to give a full understanding of the embodiments of the present disclosure. However, those skilled in the art will realize that the technical solution of the present disclosure can be practiced with omitting one or more of the specific details, or other methods, components, devices, steps, etc. can be adopted. In other cases, well-known technical solutions are not shown or described in detail to avoid distracting the subject and blurring various aspects of the present disclosure.

In addition, the accompanying drawings are only schematic diagrams of the present disclosure and are not necessarily drawn to scale. The same reference numerals in the figure represent the same or similar parts, so their repeated description will be omitted. Some block diagrams shown in the drawings are functional entities and do not necessarily correspond to physically or logically independent entities. These functional entities can be implemented in software, or in one or more hardware modules or integrated circuits, or in different networks and/or processor devices and/or microcontroller devices.

At present, RTS games support few types of mobile games, and lack good interactive operation functions. The control of virtual units in RTS games needs to be performed manually, which reduces the operation efficiency and game experience.

Based on this, the embodiments of the present disclosure provide an interaction method, apparatus and electronic device for tactical plans in games, so as to improve operation efficiency.

In order to facilitate the understanding of the embodiments, the interaction method for tactical plans in games disclosed in the embodiments of the present disclosure is first introduced in detail.

In some embodiments of the present disclosure, the interaction method for tactical plans in games may run on a terminal device or a server. The terminal device may be a local terminal device. When the interaction method for tactical plans in games runs on the server, the interaction method can be implemented and executed based on a cloud interaction system, where the cloud interaction system includes a server and a client device.

In some embodiments, various cloud applications, such as cloud games, can be run under the cloud interaction system. Taking cloud games as an example, a cloud game refers to a game method based on cloud computing. In the running mode of the cloud games, the running body of the game program and the presentation body of the game screen are separated. The storage and operation of the interactive method for tactical plans in games are completed on the cloud game server. The client device is used for data receiving and transmission, and presentation of the game screen. For example, the client device can be a display device with a data transmission function close to the user side, such as a mobile terminal, a TV, a computer, a handheld computer, etc. The terminal device for information processing is a cloud game server in the cloud. When playing the game, the player operates the client device to send operation instructions to the cloud game server, and the cloud game server runs the game according to the operation instructions, encodes and compresses the game screen and other data, returns it to the client device through the network, and finally decodes and outputs the game screen through the client device.

In some embodiments, the terminal device may be a local terminal device. Taking a game as an example, the local terminal device stores a game program and is used to present a game screen. The local terminal device is used to interact with the player through a graphical user interface, that is, the game program is downloaded, installed and executed through an electronic device conventionally. The graphical user interface may be provided to the player by the local terminal device in various ways. For example, the graphical user interface may be rendered and displayed on the display screen of the terminal, or may be provided to the player through holographic projection. For example, the local terminal device may include a display screen and a processor. The display screen is used for presenting a graphical user interface including game screens, and the processor is used for running the game, generating the graphical user interface, and controlling display of the graphical user interface on the display.

In some embodiments, there is provided an interaction method for tactical plans in games, where providing a graphical user interface is provided through a first terminal device, and the first terminal device may be the aforementioned local terminal device or a client device in the aforementioned cloud interaction system. And, the content displayed in the graphical user interface includes a virtual unit and at least one tactical strategy control, where each tactical strategy control is configured with a tactical plan.

Figure 1:
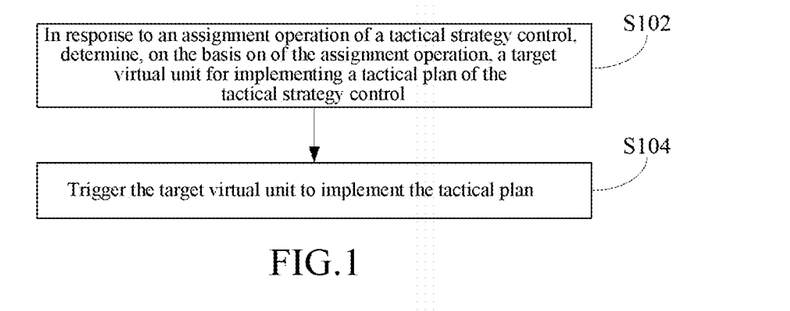
FIG. 1 is a flowchart of an interaction method for tactical plans in games provided by an embodiment of the present disclosure.

Specifically, FIG. 1 shows a flow chart of an interaction method for tactical plans in games, and the method includes the following steps.

Step S102, in response to an assignment operation of the tactical strategy control, the target virtual unit that implements the tactical plan of the tactical strategy control is determined based on the granting operation.

In the actual running process of the game, the above-mentioned tactical strategy control is usually set in a designated area of the graphical user interface, for example, is displayed on one side (for example, the right side) of the graphical user interface before the battle starts, so as to facilitate the user to perform an assignment operation.

Step S104, the target virtual unit is triggered to implement the tactical plan.

Specifically, for RTS games, the above-mentioned tactical plan usually includes an action route of the virtual unit and a sequence of the action. After the target virtual unit for implementing the tactical plan is determined in step S102, the target virtual unit can be triggered at the beginning of the battle. The target virtual unit is controlled to act on the battlefield according to the action route saved in the tactical plan, which can effectively improve the user's reaction speed and mental expectation during real-time battle and reduce the user's threshold for getting started. Meanwhile, in the case of a plurality of operations on a battlefield, it can effectively reduce the user's memory burden for tactical combination.

Therefore, in the interaction method for tactical plans in games provided by the embodiment of the present disclosure, the content displayed on the graphical user interface may include virtual units and at least one tactical strategy control, and each tactical strategy control is configured with a tactical plan. Furthermore, when responding to the assignment operation of the tactical strategy control, the target virtual unit that implements the tactical plan of the tactical strategy control can be determined based on the assignment operation, and the target virtual unit is triggered to implement the tactical plan. Since the tactical plan is configured in advance and saved in the tactical strategy control, during the game, the user can directly trigger the target virtual unit to implement the tactical plan, which effectively improves the user's reaction speed and mental expectation during real-time battle, not only facilitating the user to perform macro operations, but also to improve the game experience.

In practical applications, the above-mentioned first terminal device may be a terminal that can perform touch control, such as a smart phone, a tablet computer, a palmtop computer, etc. The graphical user interface provided by the above-mentioned first terminal device is usually a game interactive interface, such as an interactive interface of a mobile game, an online game or a cloud game etc. The game interactive interface can display the game scene, as well as the virtual units included in the game scene, the skill controls for controlling the virtual units, the setting controls for the game, and the like. Therefore, after the above-mentioned first terminal device is installed with a corresponding game client, the game scene and virtual units can be displayed on the touch screen. At the same time, the first terminal device responds to the operation in the graphical user interface, so that the user can control the game through the graphical user interface and realize the interaction of the tactical plan.

Figure 2:
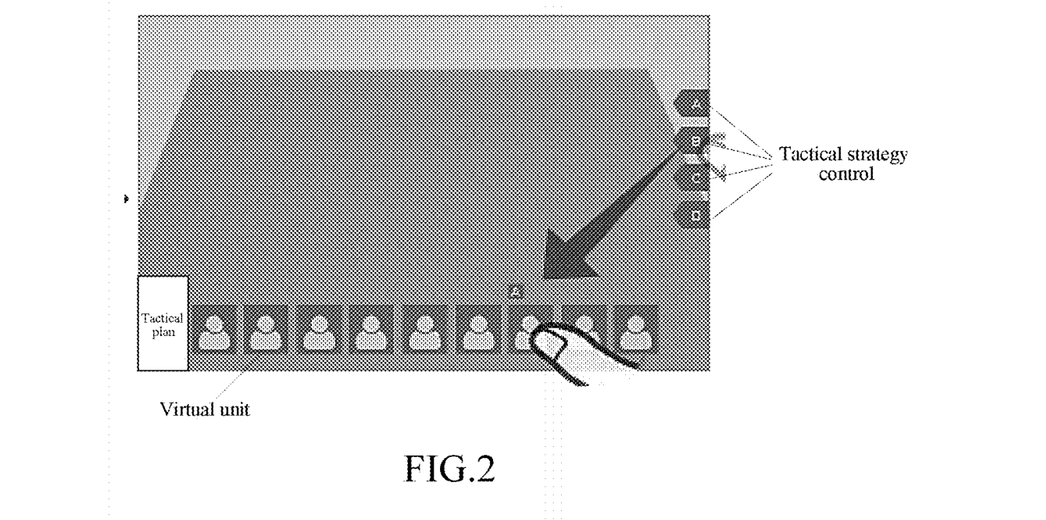
FIG. 2 is a schematic diagram of an interaction process for tactical plans in games provided by an embodiment of the present disclosure.

For ease of understanding, FIG. 2 shows a schematic diagram of the interaction process for tactical plans in games. Taking the above-mentioned first terminal device as a smart phone as an example, the graphical user interface provided by the first terminal device, as shown in FIG. 2, includes a plurality of virtual units and a plurality of tactical strategy controls, among which, it is taken as an example for illustration that four tactical strategy controls A, B, C, and D are used and the tactical strategy controls are set on the right side of the graphical user interface. Virtual units are generally set on the bottom edge of the graphical user interface to facilitate the user to configure tactics.

Specifically, in some embodiments of the present disclosure, since each tactical strategy control is configured with a tactical plan, the user can use the tactical plan configured in advance when configuring the tactics before battle. Since there usually are a plurality of virtual units, therefore, when using the tactical plan configured in advance, the target virtual unit that implements the tactical plan is usually determined according to the process of the above step S102.

Specifically, when determining the target virtual unit, if the assignment operation is a sliding operation from the tactical strategy control to the virtual unit, the virtual unit corresponding to the end position of the sliding operation is determined as the target virtual unit for implementing the tactical plan of the tactical strategy control;

At this point, the above-mentioned assignment operation is equivalent to a dragging operation, by which the tactical plan is dragged to the target virtual unit. As shown in FIG. 2, the marker A of the tactical strategy control is dragged to the top of the target virtual unit. When the battle starts, the target virtual unit will execute the tactical plan by default according to the action route of the tactical plan and the sequence of the action.

Furthermore, if the above-mentioned assignment operation is a sliding operation from the virtual unit to the tactical strategy control, the virtual unit corresponding to the starting position of the sliding operation is determined as the target virtual unit for implementing the tactical plan of the tactical strategy control. That is, in addition to the above-mentioned dragging operation of dragging the tactical plan to the target virtual unit, when performing the assignment operation of dragging, the target virtual unit can also be dragged to the position of the tactical plan, and the target virtual unit of the tactical plan that implements the tactical strategy control can also be determined.

Further, if the above assignment operation is a touch operation on the tactical strategy control and the virtual unit, the virtual unit corresponding to the touch operation is determined as the target virtual unit for implementing the tactical plan of the tactical strategy control.

For the touch operation, the tactical strategy control may be touched first, then one virtual unit as the target virtual unit may be touched, and then the tactical plan of the tactical strategy control is assigned to the target virtual unit. The specific assignment operation can be set based on the actual use. In addition, the number of tactical strategy controls may also be set according to actual use, which is not limited in the embodiments of the present disclosure.

In addition, for the case that there is a plurality of tactical strategy controls, and the tactical plans of the plurality of tactical strategy controls are assigned to the same target virtual unit, when the target virtual unit implements the tactical plan, the target virtual unit can be triggered sequentially according to the sequence of the assignment operation. In this way, the user may assign a plurality of tactical plans to the same target virtual unit.

Further, during the battle, the user can still assign the tactical plan to the target virtual unit. Specifically, if the above-mentioned assignment operation is an operation that acts on the tactical strategy control during the battle, after the target virtual unit is determined, a marker corresponding to the tactical strategy control is displayed at a preset position of the target virtual unit and the target virtual unit is triggered to implement the tactical plan corresponding to the tactical strategy control.

Further, for the tactical plan that has been assigned, a deleting or canceling operation can also be performed. Therefore, the method described in the embodiment of the present disclosure further includes: in response to a touch operation acting on the marker corresponding to the tactical strategy control, deleting the marker and the tactical plan corresponding to the marker.

For example, in FIG. 2, the marker A of the tactical strategy control above the target virtual unit means that the tactical plan of the tactical strategy control A is assigned to the virtual unit. If the tactical plan is to be canceled, it can be canceled by means of clicking the marker A of the tactical strategy control.

In actual use, the tactical plan implemented for the assignment operation during the battle is usually executed after the virtual unit has executed the assigned tactical plan. That is, when assigning a tactical plan during the battle, if the virtual unit has been assigned a tactical plan, the existing tactical plan is executed first, and then the tactical plan assigned during the battle is executed, so as to allow time for players to cancel; when assigning a tactical plan during the battle, if the tactic executed by the virtual unit are the default original tactic, that is, there is no assigned tactical plan, at this time, the virtual unit can directly execute the plan after the player assigns the tactical plan. In addition, the execution timing of the tactical plan assigned during the battle may also be set according to specific game situation, which is not limited in the embodiments of the present disclosure.

In addition, in order to facilitate the operation of a new user, when responding to the assignment operation of the tactical strategy control, an indication marker can also be displayed in the graphical user interface. The indication marker is a marker from the tactical strategy control to the target virtual unit, such as the arrow marker shown FIG. 2. In actual use, the marker may be expressed in many forms, where, the arrow shown in FIG. 2 is only one of the possible implementations. In other implementations, the marker may be associated display of parameters such as color, size, and shape, etc., which is based on actual use, not limited in the embodiment of the present disclosure.

In actual use, the above indication marker can only be displayed when the tactical plan is interacted for the first time, or be displayed every time when the game is opened to configure the tactical plan, so as to give a guidance prompt. The specific prompting manner can also be set according to the actual use, which is not limited in this embodiment of the present disclosure.

Further, for the already configured tactical plan, the tactical plan can also be displayed on the graphical user interface in response to a preview operation acting on the tactical strategy control. For example, during the battle, the tactical plan may be viewed by clicking or touching the tactical strategy controls (e.g. A, B, C, and D in FIG. 2), so as to obtain the movement of the target virtual unit during the battle.

Figure 3:
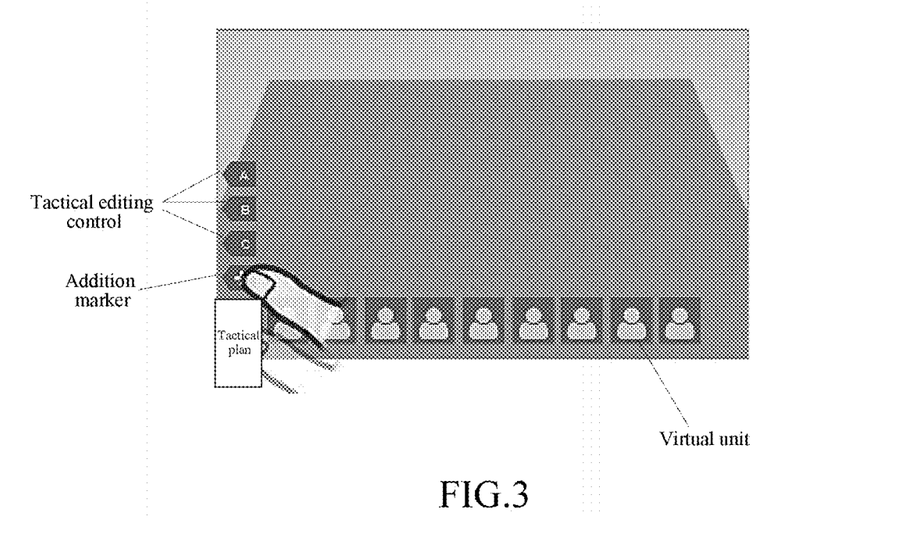
FIG. 3 is a schematic diagram of another interaction process for tactical plans in games provided by an embodiment of the present disclosure.
Figure 4:
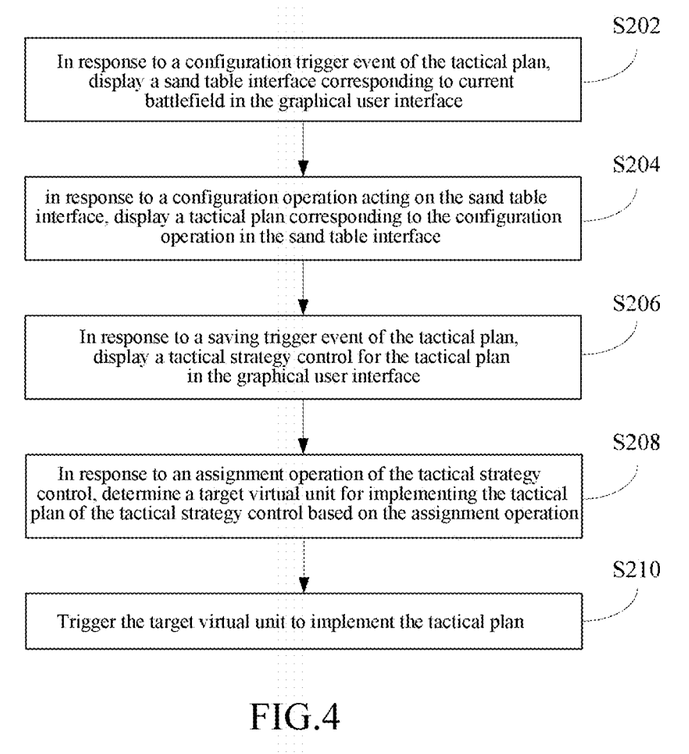
FIG. 4 is a flowchart of another interaction method for tactical plans in games provided by an embodiment of the present disclosure.

In actual use, players can also edit and configure the tactical plan configured for each tactical strategy control. Usually, the editing and configuration process of tactical plan is performed before the battle. For ease of understanding, FIG. 3 shows a schematic diagram of another interaction process for tactical plans in games. Specifically, FIG. 3 includes tactical configuration controls and a plurality of virtual units. Based on FIG. 3, FIG. 4 shows a flow chart of another interaction method for tactical plans in games to illustrate the editing and configuration process of the tactical plan. As shown in FIG. 4, the method includes the following steps.

Step S202, in response to a configuration trigger event of the tactical plan, a sand table interface corresponding to the current battlefield is displayed in the graphical user interface.

Specifically, the configuration trigger event of the tactical plan can be a click operation on the tactical plan control. When responding to the configuration trigger event of the tactical plan, the tactical editing control can be displayed in the graphical user interface, and the sand table interface corresponding to the current battlefield can be displayed in the graphical user interface in response to a touch operation on the tactical editing control.

Among them, the tactical editing control is usually also set on one side of the graphical user interface. In the schematic diagram shown in FIG. 3, the tactical editing control is set on the left side of the graphical user interface as an example for illustration, that is, the tactical editing control A, B and C in FIG. 3. When the user performs the touch operation of clicking the tactical editing control, the sand table interface corresponding to the current battlefield can be popped up in the graphical user interface for the user to configure the tactics.

During the specific implementation, the number of the above-mentioned tactical editing controls can also be set according to the actual use. Therefore, a preset number of default tactical editing controls and a preset addition marker can also be displayed in the graphical user interface; further, after the step of displaying the tactical editing control in the graphical user interface, the method further includes: adding a new tactical editing control in the graphical user interface in response to the touch operation acting on the addition marker, until the number of the tactical editing controls in the graphical user interface reaches a preset number threshold.

In actual use, when responding to the touch operation on the tactical configuration control, three tactical editing controls A/B/C can be displayed by default, and the user can click the addition marker [+] to add more tactical editing controls until the number of tactical editing controls in the graphics user interface reaches a preset number threshold.

Step S204, in response to a configuration operation acting on the sand table interface, the tactical plan corresponding to the configuration operation is displayed in the sand table interface.

Among them, the tactical plan includes a target action route of the virtual unit generated based on the configuration operation.

Figure 5:
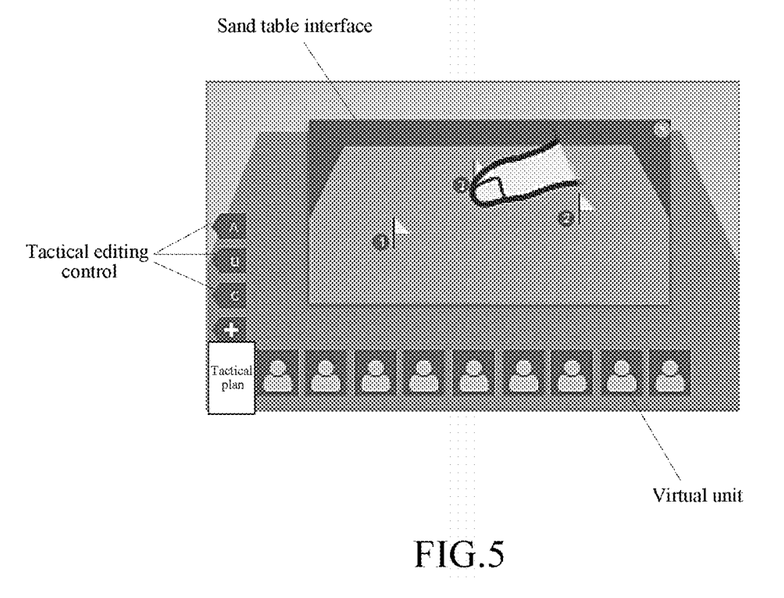
FIG. 5 is a schematic diagram of another interaction process for tactical plans in games provided by an embodiment of the present disclosure.

For ease of understanding, FIG. 5 shows a schematic diagram of another interaction process for tactical plans in games. In addition to the tactical editing controls A, B and C, the tactical configuration control and virtual units, a sand table interface is also shown.

Specifically, in this step, the step of displaying the tactical plan corresponding to the configuration operation in the sand table interface includes: adding a location marker and an action priority marker corresponding to each location marker at the touch position of the configuration operation in the sand table interface, and generating the tactical plan corresponding to the configuration operation according to the location marker and the action priority marker.

In the specific implementation, taking the configuration operation as a touch click as an example, the user can click on any area of the sand table interface, and the area in the point is the touch position. A location marker and an action priority marker corresponding to each location marker will be displayed at the touch position, such as the flag marker and the number of each flag marker in FIG. 5, where the number of the flag marker indicates the action priority. Usually, location markers are placed in combination with the battlefield terrain, the virtual units used by the enemy, the action route of the enemy virtual units, and the enemy formation, etc., to generate the movement route of the virtual units. In addition, the movement route is generally represented by a limited number of location markers, such as 3, 5 location markers, etc. Among them, in FIG. 5, the movement route of the virtual unit is represented by 3 location markers. That is, when the battle starts, the virtual unit first moves to the position corresponding to the location marker with the action priority marker of 1, then to the position corresponding to the location marker with the action priority marker of 2, and finally to the position corresponding to location marker with the action priority marker of 3.

The number of specific location markers can be set according to the actual use, which is not limited in this embodiment of the present disclosure. In addition, for the edited tactical plan, the sand table interface can be directly closed, and the placed location markers and action priority markers correspond to each location marker may be saved by default.

Further, the location marker may also be deleted in response to a deletion operation for the location marker in the sand table interface; and the action priority marker corresponding to remaining location marker in the sand table interface may be updated according to a sequence corresponding to the action priority marker. For example, the deletion operation may be a click operation on an already placed location marker, that is, the location marker may be deleted by directly clicking the location marker again, after which, the action priority marker will be updated immediately.

In addition, the process of displaying the tactical plan corresponding to the configuration operation in the sand table interface can also be realized by responding to a sliding operation acting on the sand table interface, and the tactical plan corresponding to the configuration operation may be generated according to the sliding operation. For example, the movement route of the virtual unit may be edited by means of a sliding operation in combination of factors of battlefield terrain, the virtual units used by the enemy, the walking route of the enemy virtual units, and the enemy formation, etc. The specific configuration operation can be set according to the actual use, which is not limited in the implementation of the present disclosure.

Step S206, in response to a saving trigger event of the tactical plan, the tactical strategy control of the tactical plan is displayed in the graphical user interface.

Specifically, the saving trigger event may be an operation instruction for saving the control, an operation instruction for closing the sand table interface, or any other operation instruction or event, which depends on by the actual game setting and is not limited in the implementation of the present disclosure.

Further, the specific display mode of the tactical strategy control can be referred to as shown in FIG. 2.

Step S208, in response to an assignment operation of the tactical strategy control, the target virtual unit for implementing the tactical plan of the tactical strategy control is determined based on the granting operation.

Step S210, the target virtual unit is triggered to implement the tactical plan.

Among them, the processes of steps S208 and S210 may also be referred to the corresponding processes in FIG. 1, and details are not described herein again.

To sum up, the interaction method for tactical plans in games provided by the embodiment of the present disclosure has the following beneficial effects:

(1) It helps the user to adjust the battle in real time and relieve the pressure and emotional burden of thinking about tactics. At the same time, the tactical plan is configured through the tactical strategy control, providing the user with a tactical storage area, which effectively reduces the memory burden for the user to memorize the tactics.

(2) It improves the user's operation efficiency of RTS game and reduces the repeated operations of the same tactical plan for many times for the player. The user can control different virtual units through pre-configured tactical plans, and use different tactical plans to combine various combinations to deal with other users, which increases the convenience of game control. At the same time, it also helps the user to judge and promote the game process more accurately, obtain a better game experience, reduce the memory burden of the player and reduce the game threshold.

Figure 6:
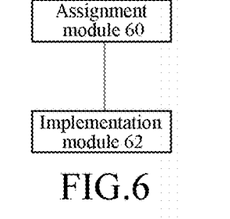
FIG. 6 is a schematic structural diagram of an interaction apparatus for tactical plans in games provided by an embodiment of the present disclosure.

On the basis of the above embodiments, there is also provided an interactive apparatus for tactical plans in games by the embodiments of the present disclosure. A graphical user interface is provided through a first terminal device, and the content displayed on the graphical user interface includes virtual units and at least one tactical strategy control, where each tactical strategy control is configured with a tactical plan. FIG. 6, shows a schematic structural diagram of an interaction apparatus for tactical plans in games, and the apparatus includes:

an assignment module 60, configured to perform determining, in response to an assignment operation of the tactical strategy control, a target virtual unit for implementing the tactical plan of the tactical strategy control based on the assignment operation; and an implementation module 62, configured to perform triggering the target virtual unit to implement the tactical plan.

Specifically, the above-mentioned assignment module 60 is also configured to perform, if the assignment operation is a sliding operation from the tactical strategy control to the virtual unit, determining a virtual unit corresponding to an end position of the sliding operation as the target virtual unit for implementing the tactical plan of the tactical strategy control;

if the assignment operation is a touch operation on the tactical strategy control and the virtual unit, determining a virtual unit corresponding to the touch operation as the target virtual unit for implementing the tactical plan of the tactical strategy control; and if the assignment operation is a sliding operation from the virtual unit to the tactical strategy control, determining a virtual unit corresponding to a starting position of the sliding operation as the target virtual unit for implementing the tactical plan of the tactical strategy control.

Further, the above-mentioned tactical strategy control comprises a plurality of tactical strategy controls, and the tactical plans of the plurality of tactical strategy controls are assigned to the same target virtual unit. The above-mentioned implementation module is further configured to perform: in accordance with the sequence of assignment operation, triggering the target virtual unit to implement the tactical plans of the plurality of tactical strategy controls sequentially.

Figure 7:
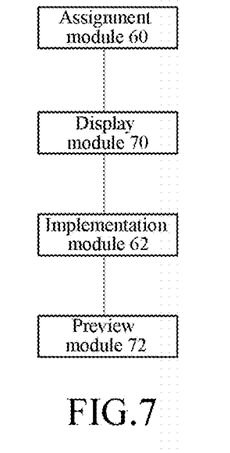
FIG. 7 is a schematic structural diagram of another interaction apparatus for tactical plans in games provided by an embodiment of the present disclosure.

On the basis of FIG. 6, FIG. 7 shows a schematic structural diagram of another interaction apparatus for tactical plans in games. In addition to the structure shown in FIG. 6, the above apparatus also includes:

a display module 70, configured to perform displaying an indication marker in the graphical user interface in response to the assignment operation of the tactical strategy control, where the indication marker is a marker from the tactical strategy control to the target virtual unit.

Further, the above-mentioned implementation module 62 is further configured to perform, if the assignment operation is an operation acting on the tactical strategy control during battle, displaying a marker corresponding to the tactical strategy control at a preset position of the target virtual unit and triggering the target virtual unit to implement a tactical plan corresponding to the tactical strategy control, after the target virtual unit is determined.

Further, the above-mentioned implementation module 62 is further configured to perform, in response to a touch operation acting on the marker corresponding to the tactical strategy control, deleting the marker and the tactical plan.

Further, the above-mentioned apparatus also includes:

a preview module 72, configured to perform displaying the tactical plan on the graphical user interface in response to a preview operation acting on the tactical strategy control.

Figure 8:
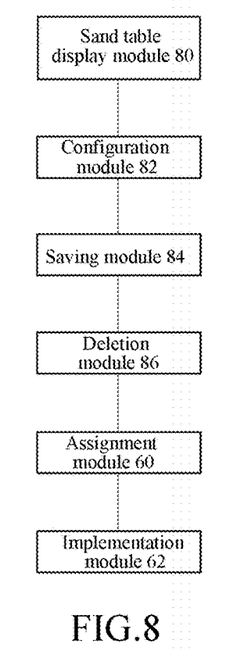
FIG. 8 is a schematic structural diagram of another interaction apparatus for tactical plans in games provided by an embodiment of the present disclosure.

Further, on the basis of FIG. 6, FIG. 8 shows a schematic structural diagram of another interaction apparatus for tactical plans in games, and the above-mentioned interaction apparatus for tactical plans in games further includes:

a sand table display module 80, configured to perform displaying the sand table interface corresponding to the current battlefield in the graphical user interface in response to a configuration trigger event of the tactical plan;

a configuration module 82, configured to perform displaying the tactical plan corresponding to the configuration operation in the sand table interface in response to the configuration operation acting on the sand table interface, where, the tactical plan includes the target action route of the virtual unit generated based on the configuration operation;

a saving module 84, configured to perform displaying the tactical strategy controls of the tactical plan in the graphical user interface in response to a saving trigger event of the tactical plan.

Further, the above-mentioned sand table display module 80 is further configured to perform: displaying a tactical editing control in the graphical user interface; and displaying the sand table interface corresponding to the current battlefield in the graphical user interface in response to a touch operation acting on the tactical editing control.

Further, the above-mentioned sand table display module 80 is further configured to perform: displaying a preset number of default tactical editing controls and a preset addition marker in the graphical user interface; and after the step of displaying the tactical editing control in the graphical user interface, in response to a touch operation acting on the addition marker, adding a new tactical editing control in the graphical user interface until the number of tactical editing controls in the graphical user interface reaches a preset number threshold.

Further, the above-mentioned configuration module 82 is further configured to perform: adding a location marker and an action priority marker corresponding to each the location marker at a touch position of the configuration operation in the sand table interface, and generating the tactical plan corresponding to the configuration operation according to the location marker and the action priority marker; or in response to a sliding operation acting on the sand table interface, generating the tactical plan corresponding to the configuration operation according to the sliding operation.

Further, in the schematic structural diagram of the interaction apparatus for tactical plans in games shown in FIG. 8, the apparatus also includes:
a deletion module 86, configured to perform deleting the location marker in response to a deletion operation for the location marker in the sand table interface; and updating the action priority marker corresponding to remaining location marker in the sand table interface according to a sequence corresponding to the action priority marker.

In the interaction apparatus for tactical plans in games provided by the embodiments of the present disclosure, the content displayed on the graphical user interface may include virtual units and at least one tactical strategy control, and each tactical strategy control is configured with a tactical plan. Furthermore, when responding to the assignment operation of the tactical strategy control, the target virtual unit that implements the tactical plan of the tactical strategy control can be determined based on the assignment operation, and the target virtual unit is triggered to implement the tactical plan. Since the tactical plan is configured in advance and saved in the tactical strategy control, during the game, the user can directly trigger the target virtual unit to implement the tactical plan, which effectively improves the user's reaction speed and mental expectation during real-time battle, not only facilitating the user to perform macro operations, but also to improve the game experience.

The implementation principle and the resulting technical effects of the interaction apparatus for tactical plans in games provided by the embodiments of the present disclosure are the same as the aforementioned embodiments of the interaction method for tactical plans in games. For brief description, where the embodiments of the apparatus are not mentioned, reference may be made to the corresponding content in the foregoing method embodiments, which will not be repeated here.

An embodiment of the present disclosure further provides an electronic device, including a memory, a processor, and a computer program stored in the memory and executable on the processor. When the processor executes the computer program, the steps of the interaction method for tactical plans in games provided by the foregoing embodiments are implemented.

Figure 9:
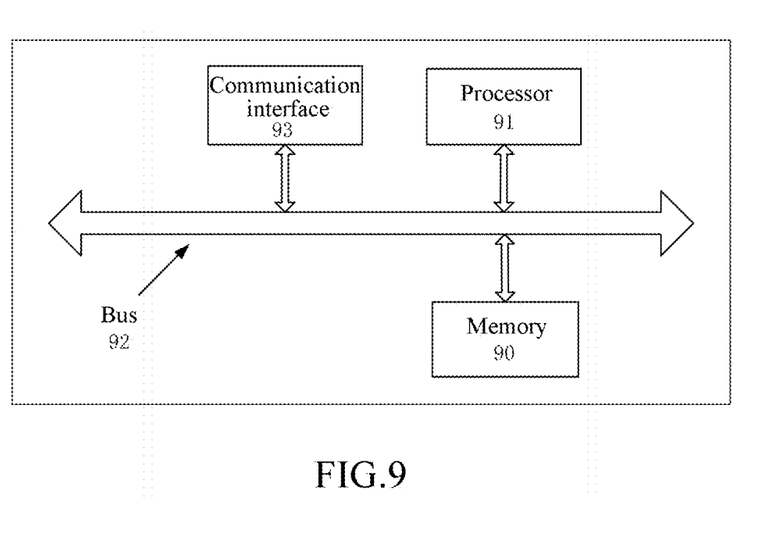
FIG. 9 is a schematic structural diagram of an electronic device according to an embodiment of the present disclosure.

An embodiment of the present disclosure also provides a schematic structural diagram of an electronic device, as shown in FIG. 9, which is a schematic structural diagram of the electronic device, where the electronic device includes a processor 91 and a memory 90, and the memory 90 stores computer-executable instructions executed by the processor 91. The processor 91 executes the computer-executable instructions to implement the above-mentioned interaction method for tactical plans in games.

In some embodiments, as shown in FIG. 9, the electronic device further includes a bus 92 and a communication interface 93, where the processor 91, the communication interface 93 and the memory 90 are connected through the bus 92.

Among them, the memory 90 may include a high-speed random access memory (RAM, Random Access Memory), and may also include anon-volatile memory, such as at least one disk memory. The communication connection between the network element of the system and at least one other network element is realized through at least one communication interface 93 (being wired or wireless), which may use the Internet, a wide area network, a local network, a metropolitan area network, and the like. The bus 92 may be an ISA (Industry Standard Architecture) bus, a PCI (Peripheral Component Interconnect standard) bus, or an EISA (Extended Industry Standard Architecture) bus, or the like. The bus 92 can be divided into an address bus, a data bus, a control bus, and the like. For ease of representation, only one bidirectional arrow is shown in FIG. 9, but it does not mean that there is only one bus or one type of bus.

The processor 91 may be an integrated circuit chip with signal processing capability. In the implementation process, each step of the above-mentioned method can be completed by a hardware integrated logic circuit in the processor 91 or an instruction in the form of software. The above-mentioned processor 91 may be a general-purpose processor, including a central processing unit (CPU), a network processor (NP), etc.; it may also be a digital signal processor (DSP), application specific integrated circuit (ASIC), field-programmable gate array (FPGA) or other programmable logic devices, discrete gate or transistor logic devices, and discrete hardware components. The general-purpose processor may be a microprocessor or the processor may be any conventional processor or the like. The steps of the method disclosed in conjunction with the embodiments of the present disclosure may be directly embodied as executed by a hardware decoding processor, or executed by a combination of hardware and software modules in the decoding processor. The software modules may be located in random access memory, flash memory, read-only memory, programmable read-only memory or electrically erasable programmable memory, registers and other storage media mature in the art. The storage medium is located in the memory, and the processor 91 reads the information in the memory, and completes the steps of the interaction method for tactical plans in games in the embodiments in combination with its hardware.

An embodiment of the present disclosure further provides a computer-readable storage medium, where a computer program is stored on the computer-readable storage medium, and the computer program executes the steps of the above method when the computer program is executed by a processor.

The computer program product of the interactive method, apparatus and electronic device for tactical plans in games provided by the embodiments of the present disclosure includes a computer-readable storage medium storing program codes, and the instructions included in the program codes can be used to execute the method described in the foregoing method embodiments. For the specific implementation, it may be referred to the method embodiment, which will not be repeated here.

Those skilled in the art can clearly understand that, for the convenience and brevity of description, for the specific working process of the device described above, reference may be made to the corresponding process in the foregoing method embodiments, which will not be repeated here.

In addition, in the description of the embodiments of the present disclosure, unless otherwise expressly specified and limited, the terms "installed", "to be connected" and "connected" should be understood in a broad sense. For example, it may be a fixed connection or a detachable connection, or integrally connected; it may be a mechanical connection or an electrical connection; it may be a direct connection, or an indirect connection through an intermediate medium, or the internal communication between the two components. For those skilled in the art, the specific meanings of the above terms in the present disclosure can be understood in specific situations.

The functions, if implemented in the form of software functional units and sold or used as independent products, may be stored in a computer-readable storage medium. Based on this understanding, in essence, the technical solution of the present disclosure or the part that contributes to the prior art or the part of the technical solution may be embodied in the form of a software product. The computer software product is stored in a storage medium and includes several instructions to enable a computer device (which may be a personal computer, a server, or a network device, etc.) to perform all or part of the steps of the method described in each embodiment of the present disclosure. The aforementioned storage media includes a U disk, a mobile hard disk, a read-only memory (ROM), a random access memory (RAM), a magnetic disk or an optical disk and other media that can store program codes.

In the description of the present disclosure, it should be noted that the orientation or positional relationship indicated by the terms "center", "up", "down", "left", "right", "vertical", "horizontal", "inside", "outside" and the like is based on the orientation or positional relationship shown in the attached drawings. It is only for the convenience of describing the present disclosure and simplifying the description, and does not indicate or imply that the device or element referred to must have a specific orientation, be constructed and operate in a specific orientation, thus which cannot be understood as limiting the resent disclosure. In addition, the terms "first", "second" and "third" are used for descriptive purposes only and cannot be understood as indicating or implying relative importance.

Finally, it should be noted that the above embodiments are only specific embodiments of the present disclosure, which are used to explain the technical scheme of the present disclosure and not to limit it. The scope of protection of the present disclosure is not limited to this. Although the present disclosure has been described in detail with reference to the foregoing embodiments, those skilled in the art should understand that: any person familiar with the technical field may modify or easily think of changes to the technical solution described in the foregoing embodiments, or equivalently replace some of the technical features within the technical scope of the present disclosure. However, these modifications, changes or substitutions do not make the essence of the corresponding technical solutions deviate from the spirit and scope of the technical solutions of the embodiments of the present disclosure, and should be included in the scope of protection of the present disclosure. Therefore, the protection scope of the present disclosure shall be subject to the protection scope of the claims.

What is claimed is:

1. An interaction method for tactical plans in games, wherein a graphical user interface is provided through a terminal device, and a content displayed on the graphical user interface comprises at least one virtual unit and a tactical strategy control, wherein the tactical strategy control is configured with a tactical plan; and the method comprises:
   determining, in response to an assignment operation of the tactical strategy control, a target virtual unit for implementing the tactical plan of the tactical strategy control based on the assignment operation; and
   triggering the target virtual unit to implement the tactical plan;
   wherein the method further comprises:
   displaying a sand table interface corresponding to a current battlefield in the graphical user interface in response to a configuration trigger event of the tactical plan;
   displaying, in response to a configuration operation acting on the sand table interface, a tactical plan corresponding to the configuration operation in the sand table interface; wherein, the tactical plan comprises a target action route of a virtual unit generated based on the configuration operation; and
   displaying a tactical strategy control for the tactical plan in the graphical user interface in response to a saving trigger event of the tactical plan.

2. The method according to claim 1, wherein the step of determining the target virtual unit for implementing the tactical plan of the tactical strategy control based on the assignment operation comprises:
   in response to determining that the assignment operation is a sliding operation starting from the tactical strategy control to a virtual unit, determining the virtual unit corresponding to an end position of the sliding operation as the target virtual unit for implementing the tactical plan of the tactical strategy control.

3. The method according to claim 1, wherein the content displayed on the graphical user interface comprises a plurality of tactical strategy controls, and tactical plans of the plurality of tactical strategy controls are assigned to the same target virtual unit;
   the step of triggering the target virtual unit to implement the tactical plan comprises:
   triggering the target virtual unit to implement the tactical plans of the plurality of tactical strategy controls sequentially according to a sequence of the assignment operation.

4. The method according to claim 1, wherein the method further comprises:
   displaying an indication marker in the graphical user interface in response to the assignment operation of the tactical strategy control, wherein the indication marker comprises a marker extending from the tactical strategy control to the target virtual unit.

5. The method according to claim 1, wherein the step of triggering the target virtual unit to implement the tactical plan further comprises:
in response to determining that the assignment operation is an operation acting on the tactical strategy control during battle, displaying a marker corresponding to the tactical strategy control at a preset position of the target virtual unit and triggering the target virtual unit to implement the tactical plan corresponding to the tactical strategy control.

6. The method according to claim 5, wherein the method further comprises:
deleting the marker and the tactical plan corresponding to the marker in response to a touch operation acting on the marker corresponding to the tactical strategy control.

7. The method according to claim 1, wherein the method further comprises:
displaying the tactical plan on the graphical user interface in response to a preview operation acting on the tactical strategy control.

8. The method according to claim 1, wherein the step of displaying the sand table interface corresponding to the current battlefield in the graphical user interface comprises:
displaying a tactical editing control in the graphical user interface; and
displaying the sand table interface corresponding to the current battlefield in the graphical user interface in response to a touch operation acting on the tactical editing control.

9. The method of claim 8, wherein the step of displaying the tactical editing control in the graphical user interface comprises:
displaying a preset number of default tactical editing controls and a preset addition marker in the graphical user interface; and
the method further comprises:
adding, in response to a touch operation acting on the addition marker, a new tactical editing control in the graphical user interface, until a number of tactical editing controls in the graphical user interface reaches a preset number threshold.

10. The method according to claim 1, wherein, the step of displaying, in response to the configuration operation acting on the sand table interface, the tactical plan corresponding to the configuration operation comprises:
generating, by adding a location marker and an action priority marker corresponding to the location marker at a touch position of the configuration operation in the sand table interface, the tactical plan corresponding to the configuration operation according to the location marker and the action priority marker.

11. The method according to claim 10, wherein the method further comprises:
deleting the location marker in response to a deletion operation for the location marker in the sand table interface; and
updating the action priority marker corresponding to a remaining location marker in the sand table interface according to a sequence corresponding to the action priority marker.

12. The method according to claim 1, wherein the step of determining the target virtual unit for implementing the tactical plan of the tactical strategy control based on the assignment operation comprises:
in response to determining that the assignment operation is a touch operation on the tactical strategy control and a virtual unit, determining the virtual unit corresponding to the touch operation as the target virtual unit for implementing the tactical plan of the tactical strategy control.

13. The method according to claim 1, wherein the step of determining the target virtual unit for implementing the tactical plan of the tactical strategy control based on the assignment operation comprises:
in response to determining that the assignment operation is a sliding operation starting from a virtual unit to the tactical strategy control, determining the virtual unit corresponding to a starting position of the sliding operation as the target virtual unit for implementing the tactical plan of the tactical strategy control.

14. The method according to claim 1, wherein, the step of displaying, in response to the configuration operation acting on the sand table interface, the tactical plan corresponding to the configuration operation comprises:
generating, in response to a sliding operation acting on the sand table interface, the tactical plan corresponding to the configuration operation according to the sliding operation.

15. An electronic device, comprising a memory, a processor, and a computer program stored on the memory and executable on the processor, wherein a graphical user interface is provided through the electronic device, and a content displayed on the graphical user interface comprises at least one virtual unit and a tactical strategy control, the tactical strategy control is configured with a tactical plan; and when the processor executes the computer program, the electronic device is caused to:
determine, in response to an assignment operation of the tactical strategy control, a target virtual unit for implementing the tactical plan of the tactical strategy control based on the assignment operation; and
trigger the target virtual unit to implement the tactical plan;
wherein the electronic device is further caused to:
display a sand table interface corresponding to a current battlefield in the graphical user interface in response to a configuration trigger event of the tactical plan;
display, in response to a configuration operation acting on the sand table interface, a tactical plan corresponding to the configuration operation in the sand table interface; wherein, the tactical plan comprises a target action route of a virtual unit generated based on the configuration operation; and
display a tactical strategy control for the tactical plan in the graphical user interface in response to a saving trigger event of the tactical plan.

16. The electronic device according to claim 15, wherein the electronic device is further caused to:
display an indication marker in the graphical user interface in response to the assignment operation of the tactical strategy control, wherein the indication marker comprises a marker extending from the tactical strategy control to the target virtual unit.

17. The electronic device according to claim 15, wherein the electronic device is further caused to:
display the tactical plan on the graphical user interface in response to a preview operation acting on the tactical strategy control.

18. A computer-readable storage medium, wherein, a computer program is stored on the computer-readable storage medium, and when the computer program is executed by a processor, an interaction method for tactical plans in games is executed, wherein a graphical user interface is provided through a terminal device, and a content displayed on the graphical user interface comprises at least one virtual unit and a tactical strategy control, wherein the tactical strategy control is configured with a tactical plan; and the method comprises:
- determining, in response to an assignment operation of the tactical strategy control, a target virtual unit for implementing the tactical plan of the tactical strategy control based on the assignment operation; and
- triggering the target virtual unit to implement the tactical plan;
- wherein the method further comprises:
- displaying a sand table interface corresponding to a current battlefield in the graphical user interface in response to a configuration trigger event of the tactical plan;
- displaying, in response to a configuration operation acting on the sand table interface, a tactical plan corresponding to the configuration operation in the sand table interface; wherein, the tactical plan comprises a target action route of a virtual unit generated based on the configuration operation; and
- displaying a tactical strategy control for the tactical plan in the graphical user interface in response to a saving trigger event of the tactical plan.

* * * * *